US006979085B2

(12) United States Patent
Lürkens et al.

(10) Patent No.: US 6,979,085 B2
(45) Date of Patent: Dec. 27, 2005

(54) IMAGE PROJECTOR AND METHOD OF OPERATING SAME

(75) Inventors: Peter Lürkens, Aachen (DE); Carsten Deppe, Aachen (DE); Xaver Riederer, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 3 days.

(21) Appl. No.: 10/500,506

(22) PCT Filed: Dec. 18, 2002

(86) PCT No.: PCT/IB02/05745

§ 371 (c)(1), (2), (4) Date: Jun. 29, 2004

(87) PCT Pub. No.: WO03/056817

PCT Pub. Date: Jul. 10, 2003

(65) Prior Publication Data

US 2005/0077841 A1 Apr. 14, 2005

(30) Foreign Application Priority Data

Jan. 2, 2002 (DE) ................................ 102 00 023
May 8, 2002 (DE) ................................ 102 20 510

(51) Int. Cl.$^{7}$ ......................... G03B 21/26; H05B 37/02
(52) U.S. Cl. ........................................ 353/29; 315/308
(58) Field of Search .............................. 353/29, 30, 34, 353/85, 97; 315/308, 291, 307, 149, 150; 348/575, 571

(56) References Cited

U.S. PATENT DOCUMENTS 5,738,429 A * 4/1998 Tagawa et al. ............. 353/122
6,115,022 A * 9/2000 Mayer et al. ............... 345/418
6,543,900 B2 * 4/2003 Noji et al. .................... 353/94

FOREIGN PATENT DOCUMENTS

WO WO9535645 12/1995 ......... H05B 41/231

* cited by examiner

*Primary Examiner*—Thuy V. Tran
*Assistant Examiner*—Hung Tran Vy

(57) ABSTRACT

The invention relates to an image projector with a High-Intensity-Discharge HID lamp (112) and a method of operating it. Such lamps have the disadvantage that their voltaic arc jumps back and forth between different positions at unforeseeable times during operation. This so-called arc jumping has the effect of changing the brightness, i.e. the overall brightness and/or the brightness distribution of the light emitted by the HID lamp (112). For the viewer of an image projected with such a projector, this effect appears as a jolt of this projected image. To avoid such effects for the viewer, it is first proposed according to the invention that changes in the brightness of the light in the image projector's beam path are detected. As soon as a change in brightness caused by an arc jump has been detected, this brightness is reset to a brightness detected at a moment t-2 before the arc jump, in order subsequently to convert it during a predetermined time interval T to the brightness resulting from the arc jump. This resetting must occur so soon after the arc jump, and the conversion so slowly, that the changes in the brightness of the light incident on a picture screen device (118) resulting from the arc jump, the reset, and the conversion are not perceptible to the human eye.

21 Claims, 11 Drawing Sheets

FIG. 2c ii)

FIG. 2c iii)

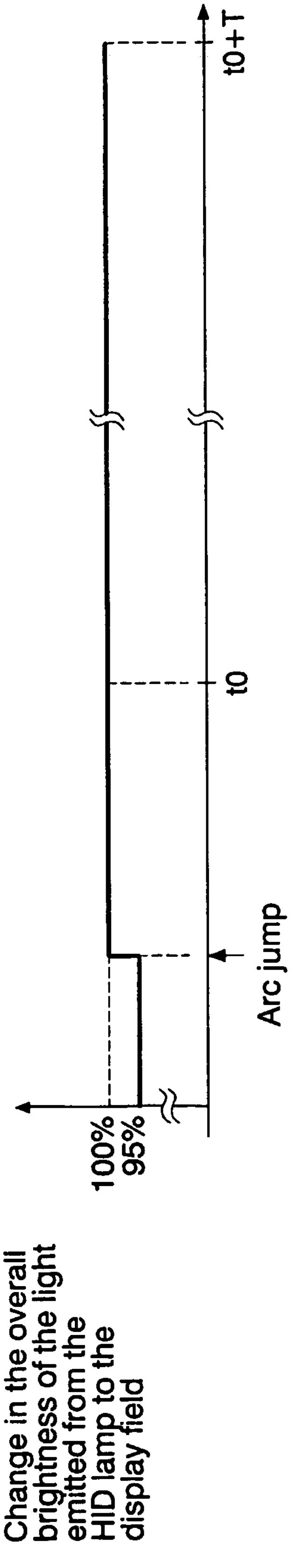
FIG. 2d i)
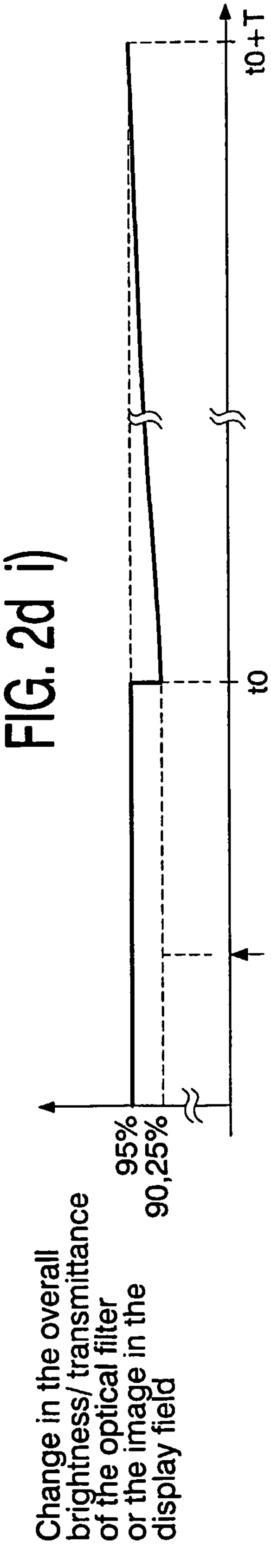
FIG. 2d ii)
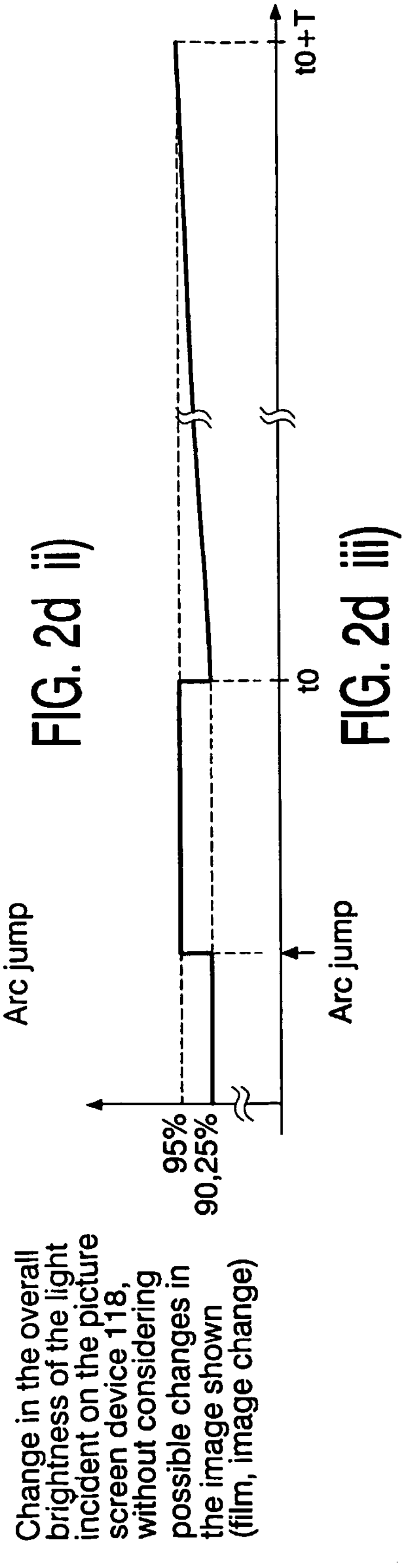
FIG. 2d iii)

IMAGE PROJECTOR AND METHOD OF OPERATING SAME

This application is a 371 of PCT/IB02/05745 Dec. 18, 2002.

The invention relates to an image projector with a High-Intensity-Discharge HID lamp as defined in the preamble of claim 1 and a method of operating it as defined in the preamble of claim 17.

Such image projectors with HID lamps are basically known from the prior art, where they are primarily used for video or presentation purposes. These lamps are distinguished by a very high luminous efficacy in combination with a small volume. However, they have the disadvantage that their voltaic arc suddenly jumps in an uncontrolled way, i.e. at unforeseeable times. Jumping means that the arc takes up a new position which is about 10 to more than 250 $\mu$m away from the original position. The human eye perceives this arc jumping as a brief jolt in a displayed or projected image. For people with sensitive eyes, this effect can be disturbing when viewing an image, and it is therefore necessary to eliminate it.

The properties of the projection system connected to the output of the lamp imply that the arc jump has the physical effect of changing the brightness, i.e. the brightness distribution and/or the overall brightness, of the displayed image in an order of magnitude of a few percentage points.

EP 766906 A1 discloses a very effective method of avoiding the effect of the arc jump as such and the associated changes in the brightness of the light in the image projector's beam path. The method disclosed therein provides for feeding the HID lamp with an electric current whose flow presents an additional pulse shortly before commutation. However, a disadvantage of this known method is that it is not compatible with modern display devices, which use a time-sequential display method. Such display devices require lamps with a constant overall brightness and brightness distribution, which cannot be ensured with the method known from EP 766906 A1 because of the additional current pulse.

Starting from this prior art, it is therefore the object of the present invention to develop a known image projector and a known method for operating it, in such a way that the effects of the arc jump in the form of changes in the overall brightness and/or the brightness distribution of an image projected on a picture screen device are not perceptible to the human eye.

This object is achieved by the subject matter of claim 1. Accordingly, the known image projector comprises a sensor device for detecting the brightness, in particular the brightness distribution and/or the overall brightness, of the light incident on the display field at different times; a comparator device for comparing the brightness of the light detected by the sensor device at a previous moment t-2 and a moment t-1, which is later in time than moment t-2, and for generating a brightness control signal which represents a change in brightness occasioned by an arc jump that occurred in the HID lamp between the moment t-2 and t-1; and a control device for compensating the detected change in brightness in response to the brightness control signal by resetting the brightness of the light incident on the picture screen device (118) at a moment t0 later than t-1, in particular in response to the brightness recorded at the previous moment t-2, and by subsequent conversion of the reset brightness during a predetermined time interval T to the brightness recorded at the later moment t-1, the resetting of the brightness occurring so soon after the arc jump, and the conversion of the brightness during the time interval T occurring so slowly, that the changes in the brightness of the light incident on the picture screen device (118) caused by the arc jump, the reset, and the conversion are not perceptible to the human eye.

For the present invention, the term "brightness" should always be understood as overall brightness and/or brightness distribution unless stated to the contrary.

The brightness, in the sense defined above, of the light incident on the picture screen device or of the image projected on the picture screen device is influenced by the various components in the image projector's optical system: As is known, the starting point for the light is the HID lamp, which does not always couple the light into the optical system in the same way, but varying in time especially because of the arc jump. This coupling at variable times results in a change in brightness of the light emitted from the HID lamp in the course of time. Furthermore, both the display field provided in the beam path and also an optical filter that may be provided for special embodiments of the present invention will influence the brightness of the light before it hits the picture screen device. Not the overall brightness, but the brightness distribution of the light will be influenced where applicable by an optical integrator additionally provided in the beam path. For the present invention, the ideal case is assumed for the lens unit that it exerts no influence on the brightness of the light, i.e. it is regarded as ideally transparent. Since the invention relates to time-variant light influences, there is no need at this point for a discussion of other, stationary influences, such as those exerted by the lens unit.

Because of the many optical components in the beam path of the optical system mentioned above, both the overall brightness and the brightness distribution of the light are different at different places in the beam path. As a result of the claimed embodiment of the image projector, disturbances or changes in the overall brightness and the brightness distribution of the light emitted from the HID lamp, caused in particular by arc jumping in the HID lamp, have no effects visible to the human eye in the light incident on the picture screen device or in the image projected on this. This is achieved, as claimed in the disclosure of claim 1, in that the described disturbances in the brightness of the light output by the HID lamp are compensated for in the beam path before the light hits the picture screen device. The compensation occurs with the resetting of the brightness at moment t0 to the brightness of moment t-2 and the subsequent conversion of the brightness during the period of time T to the brightness of moment t-1, as described in claim 1.

The claimed time ratios are especially important here. According to the invention, the duration between an arc jump occurring, recognition of the change in the brightness by the comparison, and resetting of the brightness of the light incident on the picture screen device to the brightness at moment t-2 before the arc jump is chosen to be so short that the human eye does not perceive the change in brightness that has taken place in the meantime; in other words, the human eye experiences the brightness at moment t0 as unchanged from that at moment t-2.

Only after the reset of the brightness at moment t0 is there a gradual adjustment/conversion to the changed brightness caused by the arc jump, according to the invention. This conversion of brightness to the brightness detected at the later moment t-1 occurs so slowly that it is likewise not perceived by the human eye.

According to a first embodiment of the invention, the optical system comprises an optical integrator between the HID lamp and the display field, this integrator at least partially approximating a desired uniformity, not of the overall brightness but of the brightness distribution of the light incident on the picture screen device. The possibilities described in the following embodiments, for further compensation of the brightness distribution towards achieving to a uniform distribution, are therefore only necessary if the compensation achieved by the integrator is not regarded as sufficient and additional financial resources are available for the implementation of the embodiments described in the following, or the following embodiments with the simpler integrator prove to be more favorable in terms of cost or volume/weight.

According to a further embodiment, the resetting and conversion of the brightness distribution and/or the overall brightness of the light in the beam path, as claimed in the invention, is effected by an electrically controllable optical filter arranged between the HID lamp and the display field, or between the display field and the lens unit. Alternatively, the resetting and conversion may be implemented without the optical filter by overlaying the images provided by the image processor with a gray tone mask whose overall brightness and/or brightness distribution is suitably set, before said images are displayed on the screen. In both cases, i.e. both when the optical filter is used and when the image processor is used, the resetting and conversion of the brightness occur in response to a brightness control signal provided by a comparator device.

Besides the described alternative usage of optical filter and brightness compensation in the image processor, a combination of both embodiments is obviously also possible, one part of the necessary brightness compensation then being provided by the optical filter and another part by the image processor. Thus it is feasible in particular that the optical filter only compensates the brightness distribution, while the image processor regulates the overall brightness, or vice versa. Alternatively, however, it is also feasible that both the optical filter and the image processor regulate the overall brightness and the brightness distribution in proportionate ratios.

It should be stressed again here that the optical filter and the image processor—in contrast to the optical integrator—may implement a brightness compensation, i.e. the overall brightness and/or the brightness distribution, of the light in the beam path; however, this applies only in the direction of lower brightness (loss of brightness). Thus a compensation by the optical filter and the image processor filters out light, whereas a compensation by an integrator re-distributes the available light.

According to an advantageous development of the invention, the compensation of the overall brightness, especially in the area of the brightness reserve, may be implemented, alternatively or additionally to the compensation by the image processor or by the optical filter, by a corresponding activation of the lamp driver. This has the advantage that then, if applicable, a compensation is even possible in excess of the fictitious nominal overall brightness of 100% that represents the image processor's performance limit. Such a compensation above 100% may be necessary, for example, if the arc in the HID lamp jumps to positions that cause a reduction of the brightness greater than the brightness reserve, or if no brightness reserve is to be provided (greater nominal light quantity). It may also be necessary in order to compensate for a reduction in the HID lamp's emitted light quantity caused by an arc jump after resetting.

However, such a compensation of the light quantity is also advisable in the opposite case, i.e. if an increase in the brightness of the light caused by the arc jumping must be compensated for by a brief reset of brightness at moment t0, not to the brightness at moment t-2, but to a slightly reduced light quantity in comparison. In both cases, an equalization of the light quantity has the advantage that the resetcontrol can take place more slowly without visible faults arising in the image.

An electronic circuit for regulating the overall brightness of the light in an image projector's optical system through the lamp control unit is known, for example, from the not previously published German patent application with application number 10136474.1.

In contrast to the compensation by means of the image processor and/or the optical filter, a compensation of the brightness distribution by the lamp driver and the lamp control unit is not possible.

To detect the overall brightness, it is basically sufficient if the sensor device comprises only one sensor element. On the other hand, for detecting the brightness distribution of the light incident on the display field, at least two sensor elements positioned in different places are needed.

The above object of the present invention is further achieved with a method as claimed in claim 17 for operating the described image projector. The advantages of this method correspond to the advantages cited above for the image projector. According to an advantageous embodiment of the invention, the method provides that the brightness compensation necessary for a particular arc jump is calculated by means of a mathematical compensation time function.

Further advantageous embodiments of the claimed projector and the claimed method are the subject matter of the dependent claims.

The invention will be further described with reference to embodiments shown in the drawings to which, however, the invention is not restricted.

FIG. 1 shows the hardware construction of an image projector according to a first embodiment of the invention;

FIG. 2*a* shows the change of brightness of the light incident on the picture screen device over time, according to the invention;

FIG. 2*b* shows a modification of the method according to the invention with light quantity compensation;

FIG. 2*c* shows the relationship between the brightness of the light emitted by the HID lamp and the brightness of the light incident on the picture screen device for a reduction in brightness caused by an arc jump;

FIG. 2*d* shows the relationship between the brightness of the light emitted by the HID lamp and the brightness of the light incident on the picture screen device for an increase in brightness caused by an arc jump;

Figure 5A:
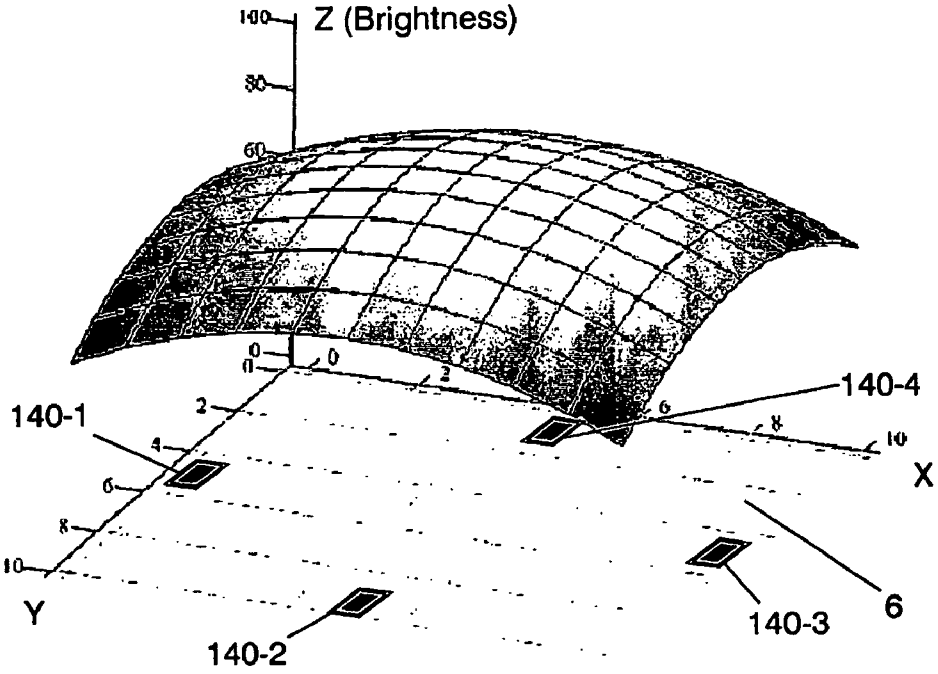
Figure 5B:
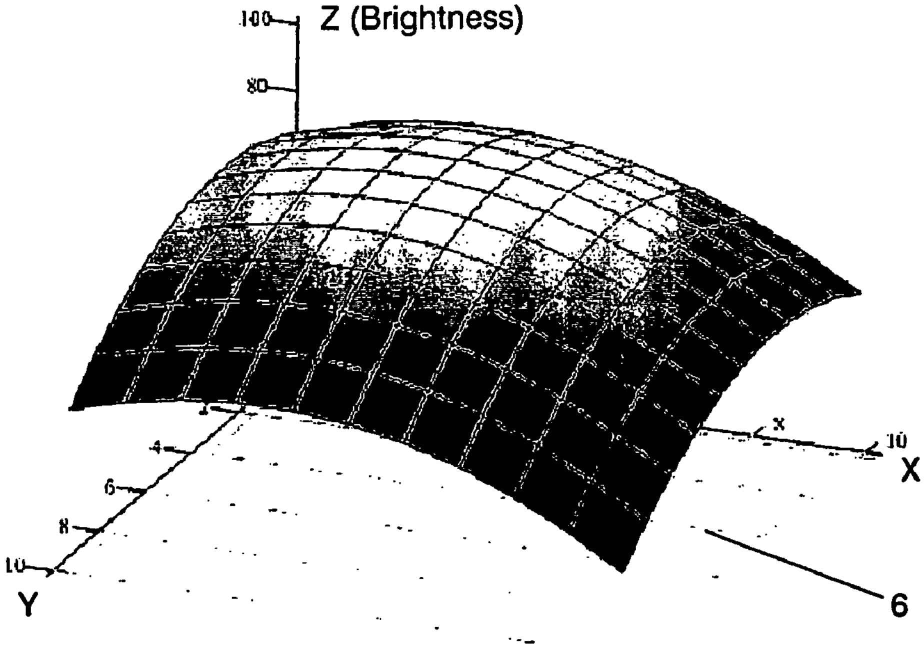
Figure 5C:
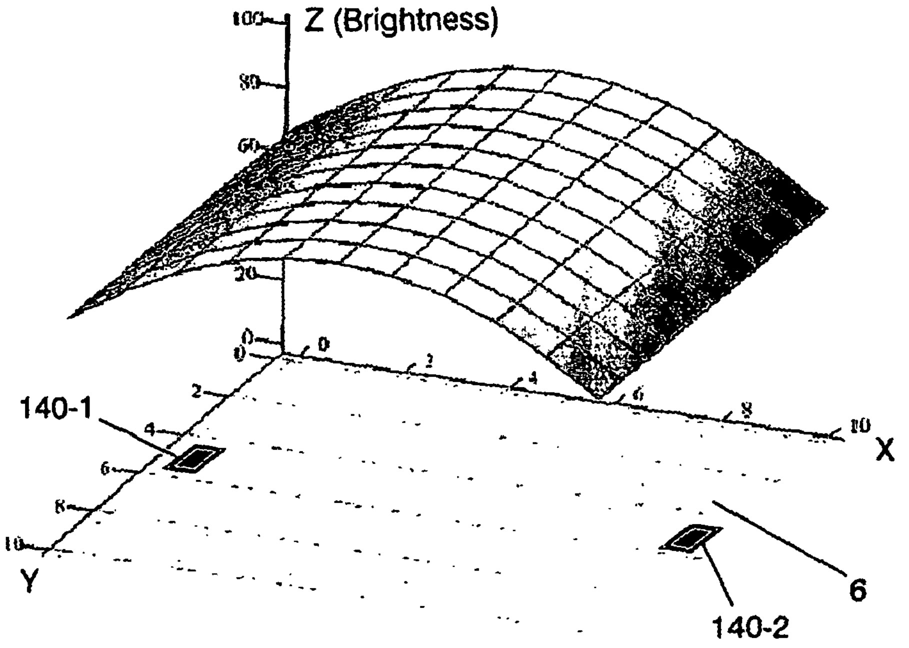
Figure 5D:
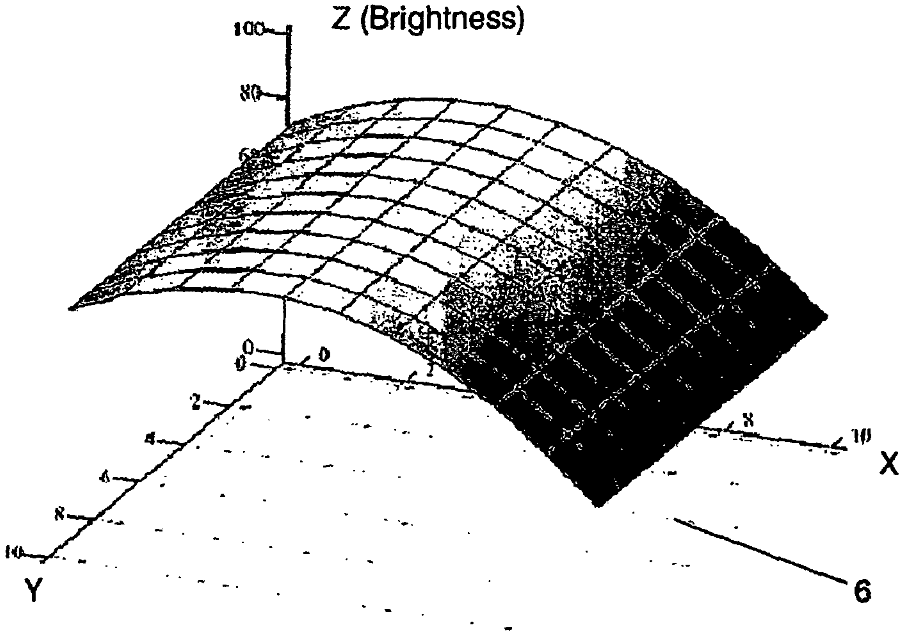
Figure 5E:
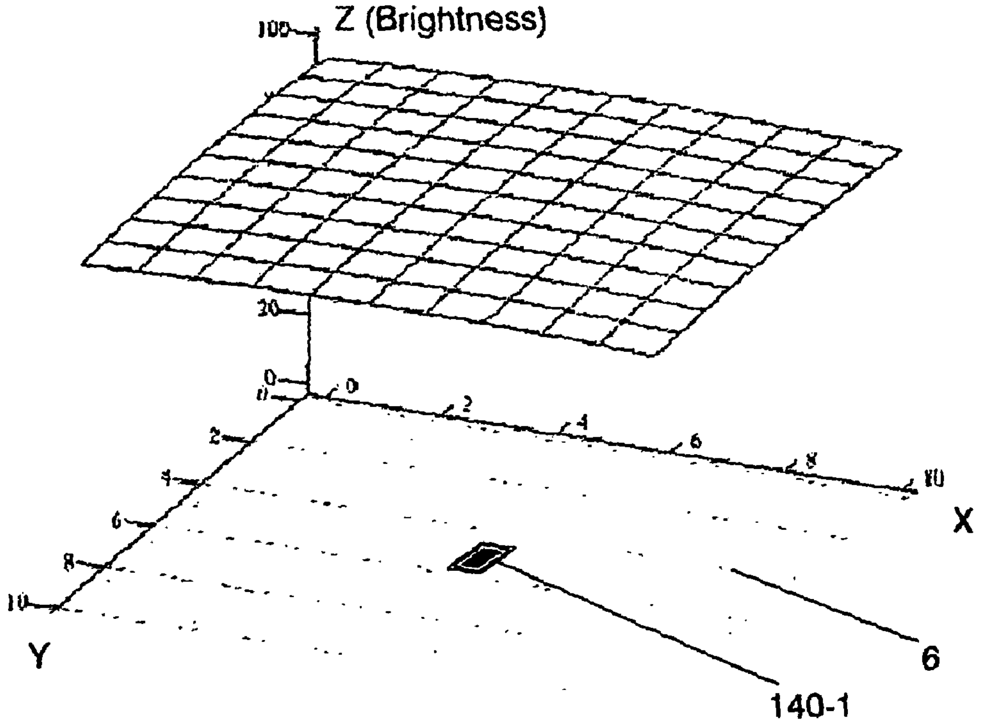
Figure 6:
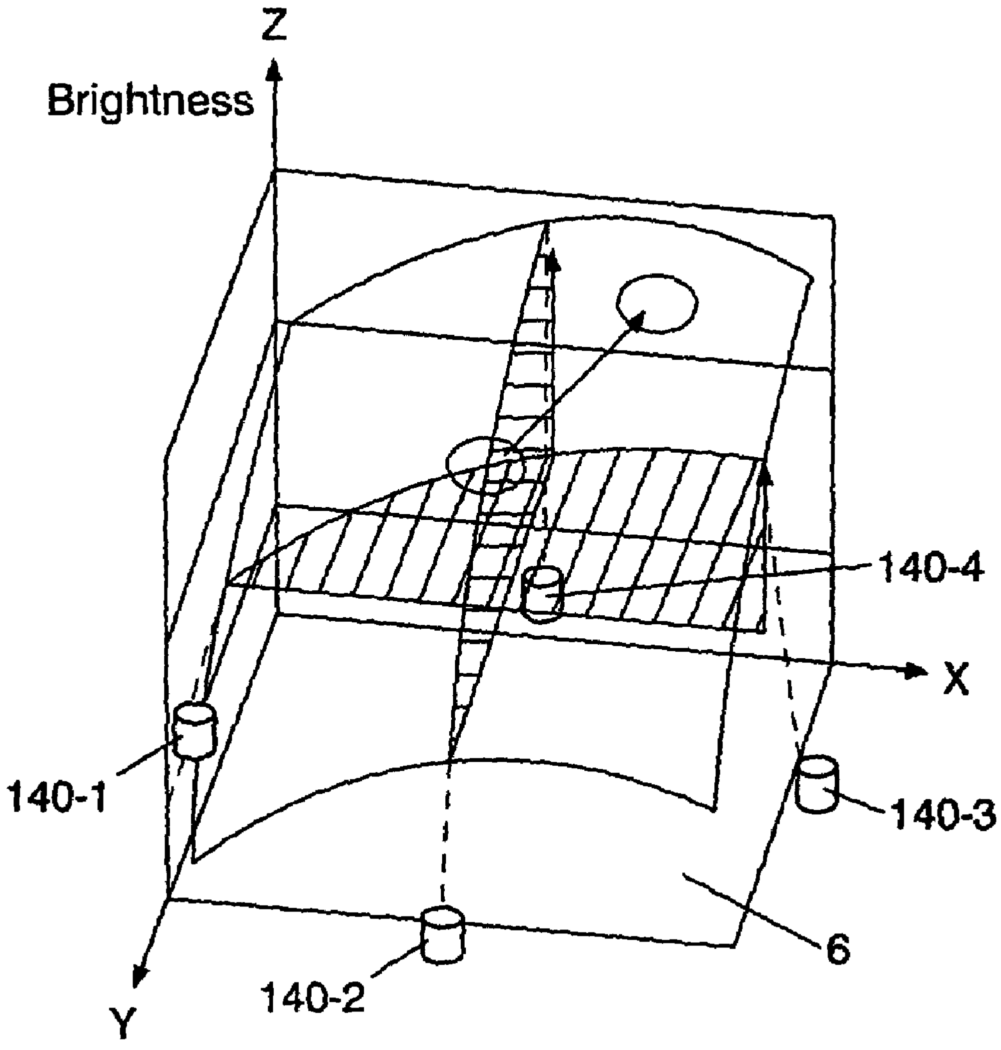

FIGS. 5*a* and *b* show the change in brightness distribution before and after the arc jump in a general case;

FIGS. 5*c* and *d* show the change in brightness distribution which is uneven in one direction only, before and after the arc jump;

FIG. 5*e* shows a brightness distribution for which only one sensor is needed; and FIG. 6 shows the estimate of the shift of the maximum of the brightness distribution because of an arc jump.

Figure 1:
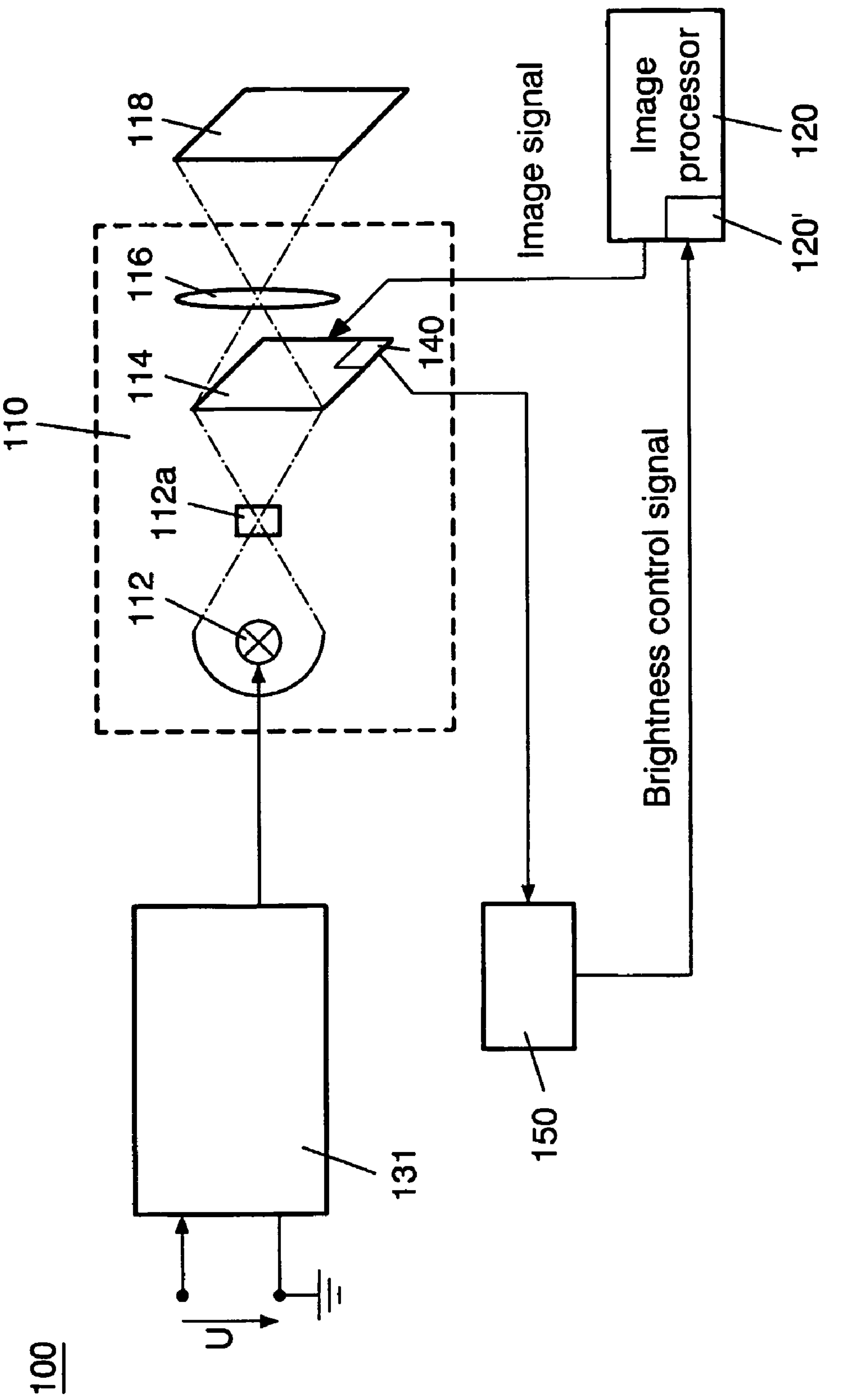

FIG. 1 shows a first embodiment of the image projector 100 according to the invention. This comprises an optical system 110 for displaying a supplied image on a picture screen device 118. The optical system 110 comprises a High-Intensity-Discharge HID lamp 112, in particular an Ultra High Pressure UHP lamp, and arranged after this an optical integrator 112*a*, a display field 114, and a lens unit 116 for projecting the supplied image onto the picture screen device 118. The image to be projected is made available to the display field 114 by an image processor 120.

The optical integrator 112*a* serves to compensate at least partially for uneven distributions of brightness in the light emitted by the lamp 112, with a view to achieving uniform distribution. The image projector 100 also comprises a lamp driver 131 for supplying a suitable operating voltage to the HID lamp 112. The lamp driver 131 itself is fed from an external voltage U.

According to the invention, the brightness, i.e. the brightness distribution and/or the overall brightness, of the light emitted from the HID lamp 112 and incident on the display field 114 is detected by a sensor device 140 at different moments. The brightnesses thus detected are fed to a comparator device 150, in order to detect any changes in the brightness in the course of time. The comparator device 150 generates a brightness control signal which represents changes detected in the brightness in the course of time by a comparison in particular. The brightness control signal is fed to a control device, i.e. the component 120' of the image processor 120. This component 120' is designed such that it adjusts the brightness of the image output by the image processor 120 to the display field 114 in response to the brightness control signal as in a method described below according to the invention such that a change in the light's brightness caused by an arc jump in the HID lamp 112 is not perceived by a viewer of the image on the picture screen device 118. In other words, the component 120' of the image processor 120 compensates for changes arising in the brightness in response to the brightness control signal.

Figure 2A:
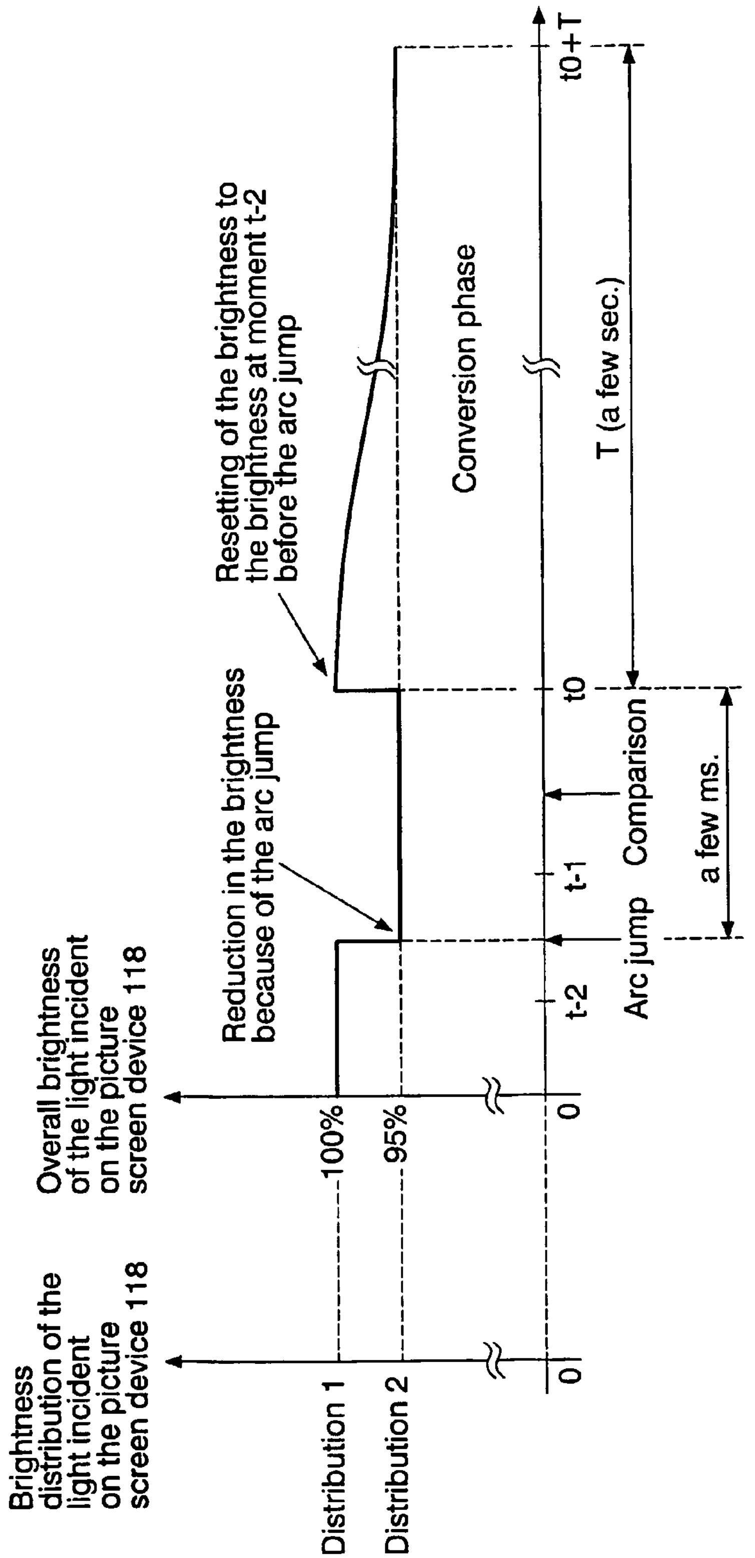

FIG. 2*a* illustrates the method according to the invention for compensating a change of brightness of the light in the beam path of the optical system 110, caused by an arc jump in the HID lamp 112. A change of brightness, i.e. of brightness distribution and/or overall brightness of the light, may arise as a result of the arc jump. FIG. 2*a* illustrates the method in the first place with the example of a change of the overall brightness of the light incident on the picture screen device 118 in the negative direction, i.e. for the case of a reduction in the overall brightness because of the arc jump. Secondly, FIG. 2*a* illustrates the method according to the invention for compensating a change in the brightness distribution caused by the same arc jump, different curve characteristics then arising for each picture element.

As can be seen from FIG. 2*a*, the overall brightness is initially taken as constant before an arc jump. This constant brightness is detected by the sensor device 140 at the moment t-2. If the same sensor device 140 detects a reduced brightness at a later moment t-1 compared with the moment t-2, this reduction in the overall brightness will be recognized by the comparator device 150.

The method according to the invention provides that immediately after a change of brightness has been registered in the comparison, this change is reversed by resetting of the brightness. It is important that the reset to the brightness present before the arc jump at moment t-2 should occur within a few milliseconds after the arc jump; this is the only way to ensure that the viewer of the image projected onto the picture screen device 118 does not register the change of brightness caused by the arc jump by seeing a jolt in the image. The method according to the invention provides that after the reset—as illustrated in FIG. 2*a*—, the brightness reset to the value before the arc jump is slowly converted to the brightness resulting from the arc jump. It is important here that this conversion should occur so slowly that the human eye observing the image on the picture screen device 118 also fails to notice this conversion of the brightness as a fluctuation in the projected image. The conversion is therefore advantageously executed over a time interval T which is made sufficiently long. The length of the time interval T is usually a few seconds, adjusted for the light/dark adaptation of the viewer's eye; but in any case it is considerably longer than the elapsed time between the arc jump and the reset of the brightness at moment t0. The inertia of the human eye is utilized in both the fast reset according to the invention and also the slow conversion of the brightness.

As is also shown in FIG. 2*a*, an analogous compensation of a changed brightness distribution caused by the arc jump (distribution 1 to distribution 2) initially occurs with a reset to the distribution 1 and a subsequent conversion of the distribution 1 to the distribution 2. Examples of the distribution 1 before the arc jump are illustrated in FIGS. 5*a*+*c*; the respective associated distributions 2 after the arc jump are shown in FIGS. 5*b*+*d*.

Figure 2B:
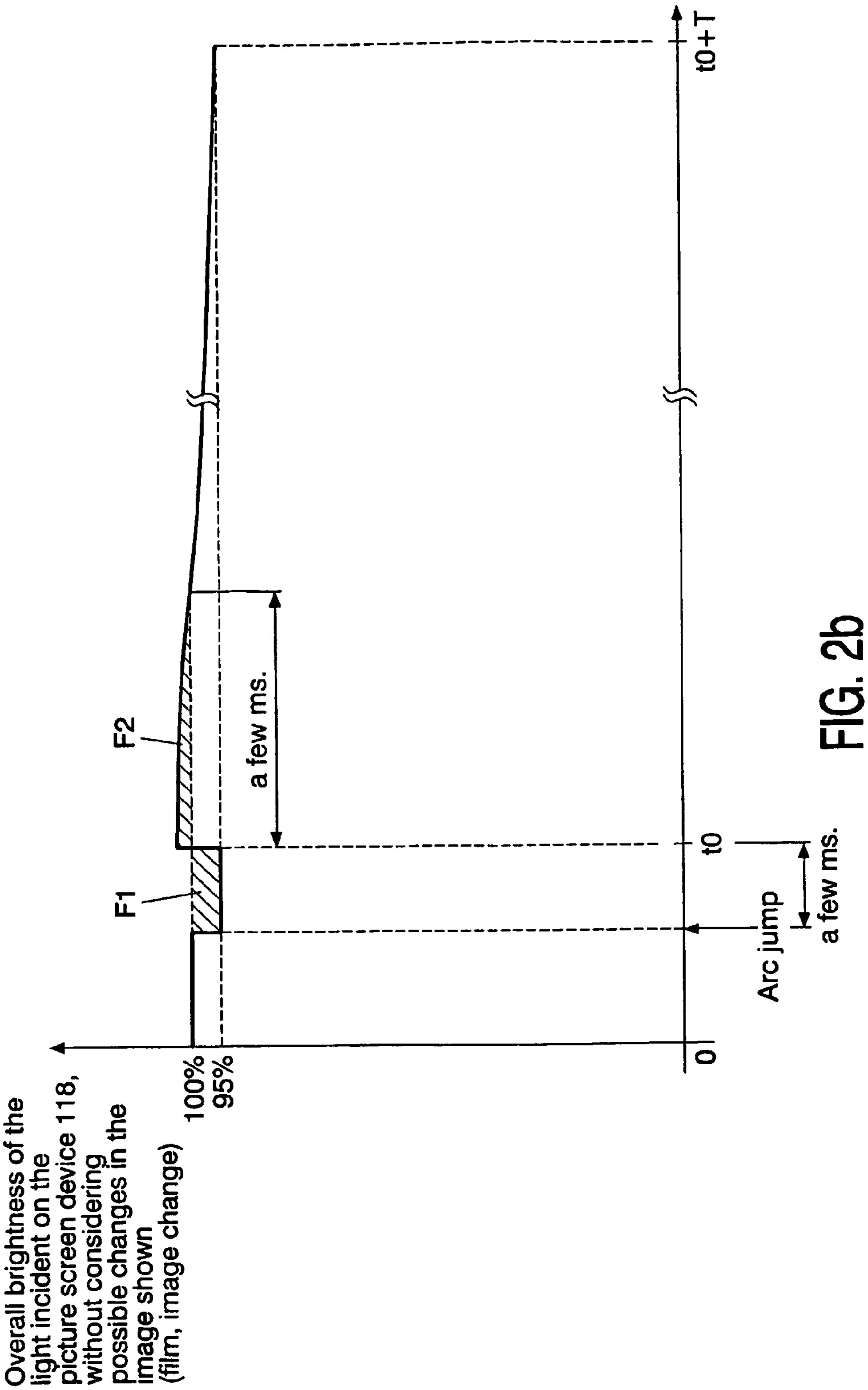

FIG. 2*b* shows a modification of the method according to the invention as illustrated in FIG. 2*a*. It is aimed at compensating the lower light quantity emitted in the period between an arc jump occurring and the subsequent resetting of the brightness of the HID lamp with respect to an unchanged arc position represented by the area F1. According to the invention, the compensation comprises a brief overloading for a few ms of the lamp 112 after the moment t0. Ideally the lamp 112 in this case emits exactly the additional light quantity represented by the area F2, which is equal to the reduction in light which previously reached the display field in the interval between the arc jump and to; i.e. F2 is preferably equal to F1. As can be seen from FIG. 2*b*, the duration of the compensation is much shorter than the duration of the time interval T.

Since the additional light quantity F2 needed for the compensation is needed for a very short time only, it is easily possible to implement this with a brief overloading of the HID lamp 112. Accordingly, a lamp control unit 132 assigned to the lamp driver 131 is preferably designed such that in this case it briefly, i.e. for a few seconds only, overloads the HID lamp 112. Such brief overloads have no negative effect on the overall life of the HID lamp 112, especially as the characteristics of the arc jumps mean that underloads occur just as often.

The compensation of the light quantity just described for the case of a reduction in brightness caused by the arc jump may occur equally well in case of an increase in brightness caused by the arc jump. The compensation then occurs after the moment t0 in the form of a briefly reduced light quantity emitted by the HID lamp 112.

As stated above, FIG. 2*a* shows the change of brightness of the light incident on the picture screen device 118. However, this brightness is not identical to the brightness of the total light output from the HID lamp 112; this is hardly changed by the arc jump.

Figure 2C:
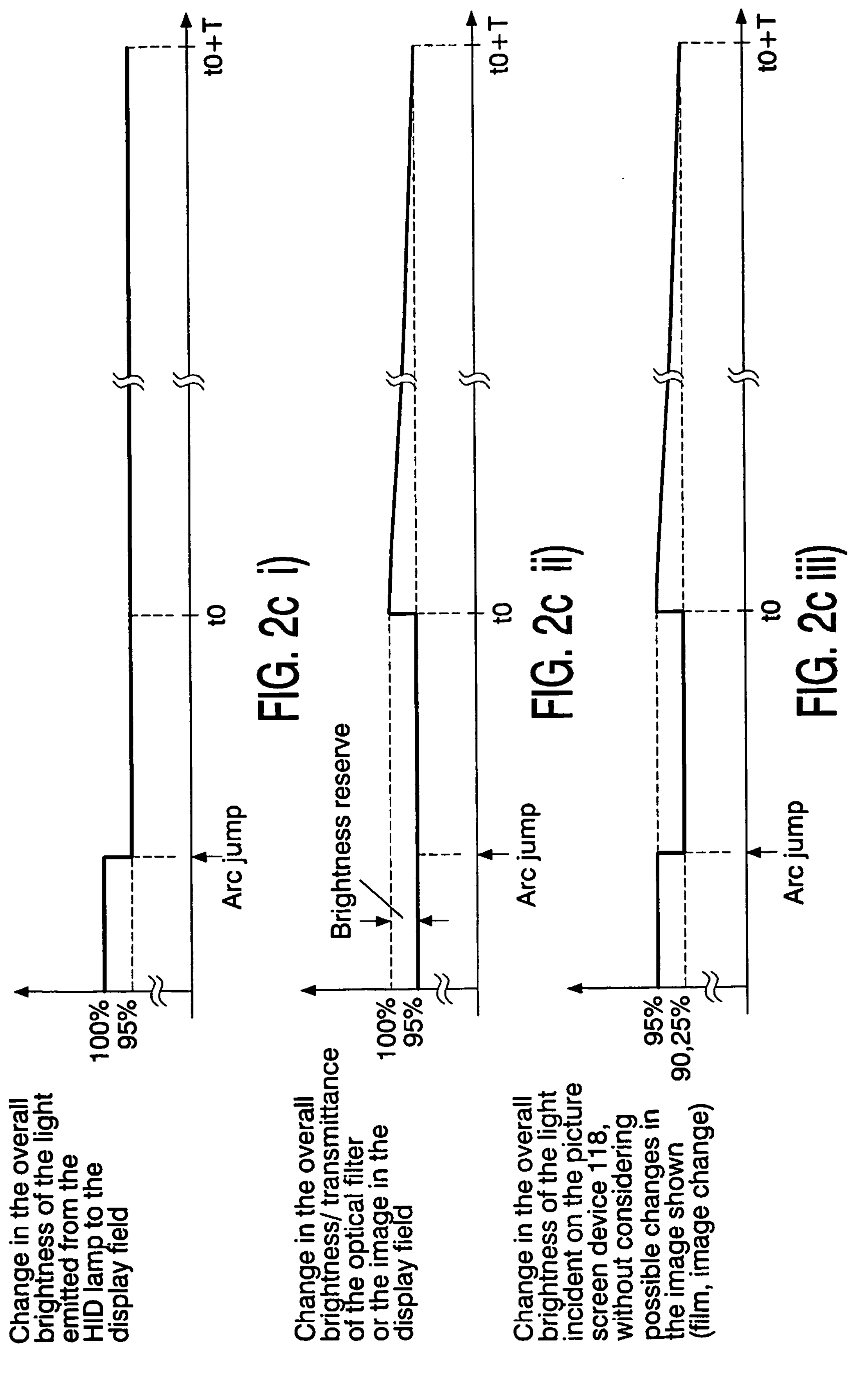

FIG. 2*c* schematically illustrates the relationships between the brightness of the light emitted by the HID lamp 112 and the brightness of the light incident on the picture screen device 118 for a reduction of brightness caused by an arc jump. As can be seen from FIG. 2*c*, the brightness of the light incident on the picture screen device 118 as in FIG. 2*ciii*) at any moment is the result of a compensation of the brightness of the light emitted by the HID lamp 112 to the display field (114) as in FIG. 2*ci*) via the various optical system elements post-connected to the HID lamp 112, such as especially the optical integrator 112*a* and the display field 114; see FIG. 2*cii*).

According to an advantageous embodiment of the method described above with reference to FIG. 2*a* according to the invention, it is especially advantageous for a compensation of the overall brightness by the image processor component 120' to provide a brightness reserve, i.e. a so-called headroom, as indicated in FIG. 2*cii*). This means that the image is not output to the display field 114 with a maximum nominal overall brightness of 100% for the image processor, but with a reduced overall brightness compared to this. The image processor's brightness reserve can be used to compensate a reduction in overall brightness caused by an arc jump. The compensation advantageously occurs so fast that the reduction in the overall brightness resulting from the arc jump is not perceived by the human eye. However, the described embodiment has the disadvantage that—even at a time when no brightness compensation is necessary because no arc jumping occurs—the nominal overall brightness of 100% for the display of the image on the picture screen device, as theoretically possible for the HID lamp and the image processor, is not fully utilized, this image instead being displayed with a reduced overall brightness only.

In order to at least partially eliminate this disadvantage, use of a further property of arc jumping is proposed. Because of the technical properties of the HID lamp, the arc jumps typically occur in phases, i.e. in several hours of operation there is no arc jumping at all, or only very occasionally. In contrast, during other phases, arc jumping occurs frequently. Thus, by evaluating the signals from the sensor device 140, the comparator device 150 can detect, for example, whether a phase with or without arc jumping is present. If no further arc jumping has occurred for at least a predefined time interval Δt1, for example 10 minutes, the overall brightness is slowly run up to 100%. This 100% overall brightness is maintained until the arc jumping resumes. For example, the comparator device may then calculate how much brightness reserve should be allowed again for a full compensation of the currently strongest arc jumps; an algorithm used for the calculation then typically specifies this newly required brightness reserve in the form of greater than 100% transmittance. The basic brightness is then reduced once more, i.e. the brightness reserve is then built up again, until the greatest change in brightness detected by the algorithm and caused by the arc jumping can once more be compensated with 100% transmittance of the image output to the display field 114. The corresponding value for the overall brightness is then maintained until the comparator device again detects that no further arc jumping has occurred for at least the time interval Δt1, for example 10 minutes.

The result of this control mechanism is in fact that the first jump result cannot be compensated and is therefore fully visible. But the effects of the subsequent arc jumps on the overall brightness of the light are increasingly reduced within a few seconds, until after a while the image appears completely stable again, in spite of ongoing arc jumping. During the time in which the arc jumping occurs, the brightness is then reduced by a maximum changed brightness value resulting from a briefly occurring arc jump, i.e. the brightness reserve is increased; in long, quieter phases the brightness rises to 100% again.

Both the reduction of the brightness reserve during long absences of arc jumping and the increase in the brightness reserve when arc jumping subsequently resumes occur so slowly that the accompanying changes of the overall brightness cannot be perceived by the human eye because of its inertia.

This variable adaptation, i.e. the sliding brightness reserve, can be quite easily implemented by charging a capacitor through a suitably selected resistance to a voltage value that represents the amplitude of the current arc jump, and subsequently discharging the capacitor through a suitable larger resistance. The voltage across the capacitor is then proportional to the necessary brightness reserve. The values of the resistances determine the desired time constants.

The provision of the described brightness reserve for the compensation of the overall brightness is not restricted to the case where the overall brightness is compensated by the image processor. The brightness reserve may be similarly provided if the compensation of the overall brightness is effected by the optical filter.

FIG. 2*d* schematically illustrates—as a virtual counterpart to FIG. 2*c*—the relationships between the brightness of the light emitted by the HID lamp 112 and the brightness of the light incident on the picture screen device 118 in the case of an increase in the brightness of the light emitted by the HID lamp 112 because of an arc jump. As can be seen from FIG. 2*d*, the compensation occurs precisely inversely to the case in FIG. 2*c*, so no further explanation of FIG. 2*d* is given.

For the implementation of the method just set forth according to the invention for compensation of a change, i.e. reduction or increase in the brightness of the light incident on the picture screen device 118 caused by an arc jump, a number of embodiments are proposed according to the invention for the image projector 100; these are described in more detail below, again with reference to FIG. 1, but also with reference to FIGS. 3 to 6.

In the above embodiment shown in FIG. 1, the brightness compensation according to the invention is exclusively effected by the image processor 120. The brightness control signal informs the component 120' of the image processor 120 of a brightness change that occurred as a result of an arc jump, i.e. a change in the overall brightness and/or the brightness distribution, for the light incident on the display field 114. In response to this brightness control signal, the component 120' then sets the brightness (transmittance) of the image output to the display field 114 in such a way that the brightness of the light incident on the picture screen device 118 is unchanged with respect to the time before the arc jump. For the example of the overall brightness of the light emitted by the HID lamp being reduced by an arc jump—as shown in FIG. 2*ci*)—the component 120' as a control device will first (i.e. at moment t0) increase the brightness (transmittance) of the image output to the display field 114 in accordance with the amount by which the brightness has been reduced. More precisely, the component 120' will increase the light transmission of the image to the extent that—as shown in FIG. 2*ciii*)—at moment t0 the brightness of the light incident on the picture screen device 118 is once again unchanged compared with the time before the arc jump. Very gradually during the subsequent conversion phase, i.e. during a predetermined time interval T, the component 120' will then once again reduce the brightness or transmittance of the image to the extent that upon expiry of this time interval T the brightness of the light incident on the picture screen device 118 is adjusted to the changed brightness resulting from the arc jump. The reset and the conversion are preferably executed with a predetermined compensation time function which is independent of a concrete embodiment.

Figure 3:
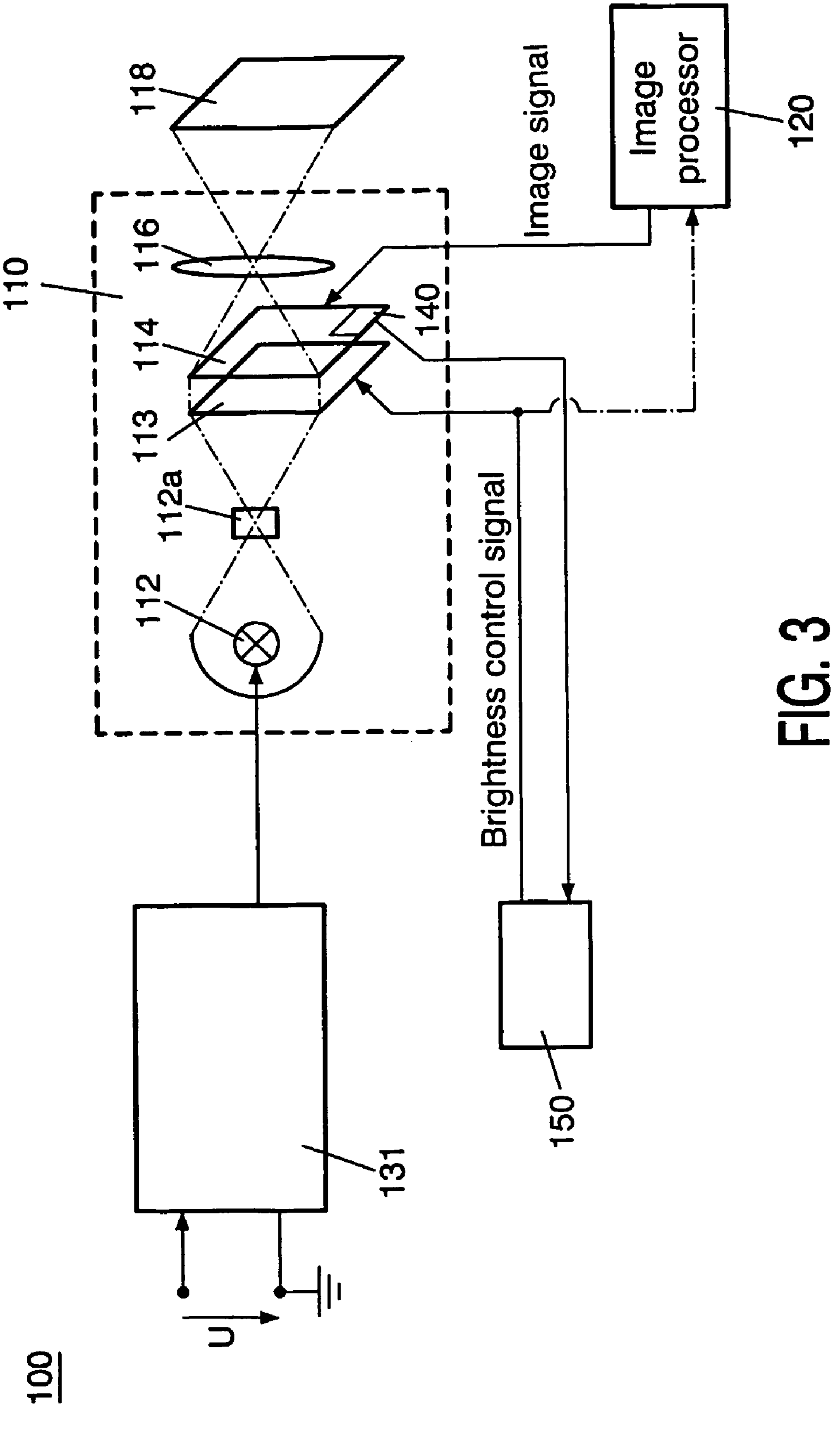
FIG. 3 shows a second, third, and fourth embodiment of the hardware construction of the image projector according to the invention.

FIG. 3 shows a second, third, and fourth embodiment for implementing the method according to the invention, described above with reference to FIG. 2. According to the second embodiment, the compensation, i.e. the resetting and the conversion of the brightness, is not executed with image processors but with an optical filter 113 arranged in the beam path in front of or behind the display field 114, this optical filter representing the control device in this case. This optical filter 113 can be controlled electronically in response to the brightness control signal output by the comparator device 150. While the image processor 120 in this second embodiment simply outputs the image for projection with a constant brightness to the display field 114, the compensation according to the invention for the light in the beam path follows from said activation of the optical filter by the brightness control signal. The optical filter 113 is preferably designed as a gray tone mask, so that the overall brightness and/or the brightness distribution of the light in the beam path can be influenced as necessary by appropriate activation. In other words, in the method according to the invention, the optical filter 113 in the second embodiment, just like the component 120' of the image processor 120 in the first embodiment, enables a compensation for the change caused by an arc jump in the brightness of the light incident on the picture screen device 118.

The third embodiment is likewise shown in FIG. 3. It is a combination of the first and second embodiments. More precisely, it provides for a implementation of the compensation according to the invention for the brightness of the light, according to a predetermined proportionate ratio, by simultaneous use of both the component 120' and the optical filter 113; in this case, they together form the control device. For this purpose it is necessary for the brightness control signal to be fed, not only to the optical filter 113, but also—as indicated by the dotted line in FIG. 3—to the component 120'. The pending compensation task may then be apportioned as desired to the optical filter 113 and the component 120'. Thus it is feasible, for example, that the component 120' only performs any necessary compensation of the brightness distribution, while the optical filter 113 implements any necessary compensation of the overall brightness. The opposite case is obviously also feasible. As an alternative to these two variants, the component 120' and the optical filter 113 may also each be used for compensating both the overall brightness and the brightness distribution; but a definition of the respective percentage shares of the component 120' and the optical filter 113 in the compensation of the brightness is then necessary.

If the optical filter 113 is not activated, the third embodiment corresponds to the first, and if the component 120' of the image processor is not activated, the third embodiment corresponds to the second embodiment.

It holds for all three embodiments of the image projector described so far that the use of the optical integrator 112*a* in the optical system 110 only necessitates a compensation of the brightness distribution by the optical filter 113 and/or the component 120' of the image processor 120 to the extent that a compensation of the brightness distribution over and above the compensation achieved by the optical integrator 112*a* is required. In other words, if the compensation of the brightness distribution achieved by the optical integrator 112*a* is judged to be adequate, the optical filter 113 and/or the component 120' only have to implement a compensation of the overall brightness. This would be the fourth embodiment shown in FIG. 3 for the image projector 100. An adequately compensated brightness distribution is shown in FIG. 5*e* below and described by way of example in the associated description.

Figure 4:
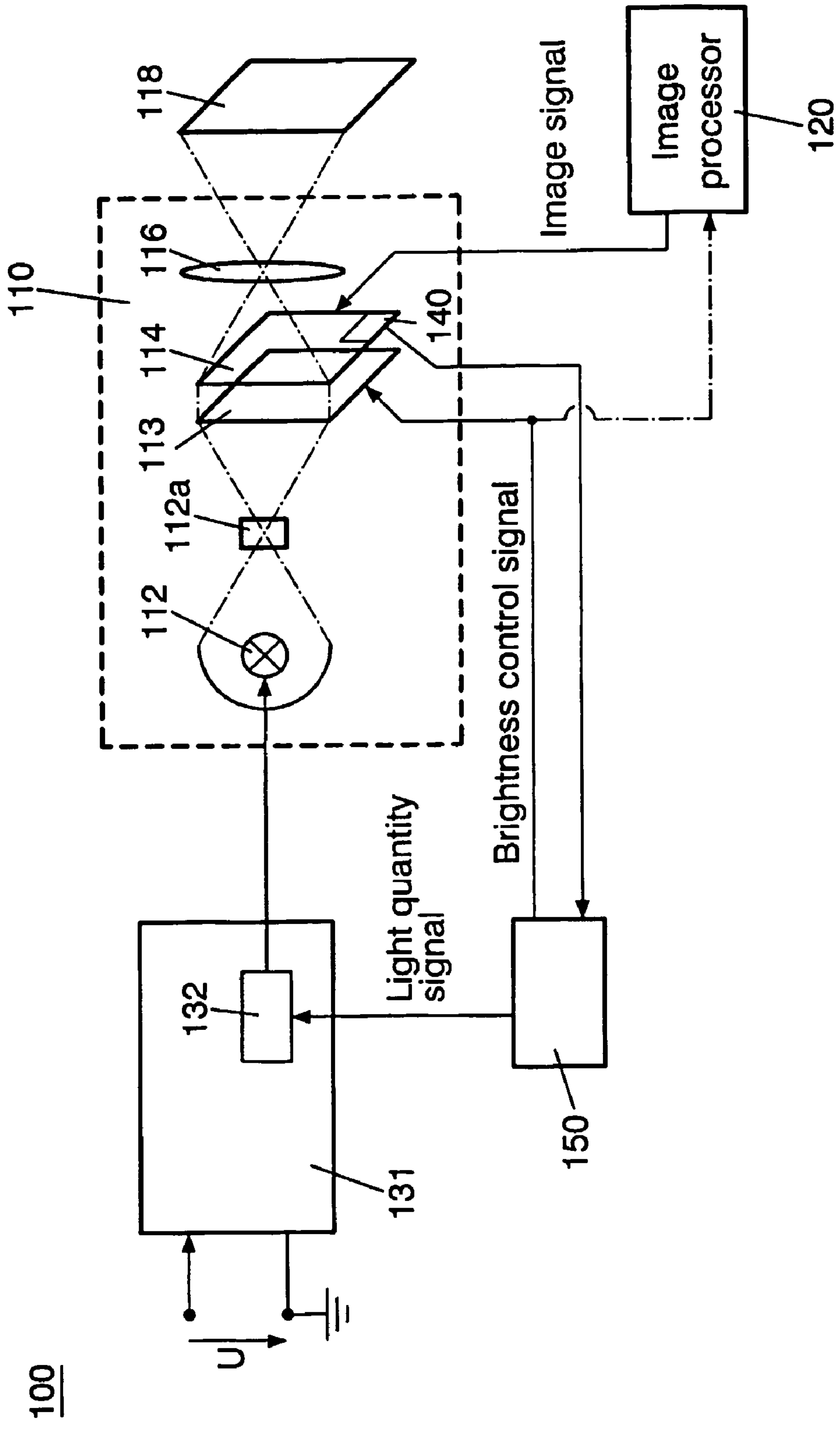
FIG. 4 shows a fifth embodiment of the hardware construction of the image projector according to the invention.

FIG. 4 shows a fifth embodiment for the hardware construction of the image projector 100 according to the invention. The hardware construction for this fifth embodiment differs from the hardware construction of the third or fourth embodiment as in FIG. 3 only in that the comparator device 150 generates not only the brightness control signal for the optical filter 113 and/or the component 120' of the image processor 120, but also a light quantity signal for the lamp control unit 132. Here the lamp control unit 132, together with the optical filter 113 and/or the component 120' where applicable, forms the control device.

The light quantity signal represents the change in the overall brightness caused by an arc jump, in so far as this is not to be compensated by the component 120' of the image processor 120 or the optical filter 113. In response to this light quantity signal, the lamp control unit 132 therefore enables, either alone or in addition to the optical filter 113 and/or the component 120', a compensation of the change in the overall brightness caused by an arc jump. In contrast to the optical filter 113 and the component 120', the lamp control unit 132 implements the compensation of the overall brightness by a corresponding activation of the lamp 112. In other words, depending on the necessary compensation direction, the lamp control unit 132 feeds more or less power to the HID lamp 112, so that the lamp 112 emits a brighter or dimmer light. In contrast to the optical filter 113 and the component 120', the lamp control unit 132 is only able to compensate the overall brightness, and not the brightness distribution. But in relation to the overall brightness, the necessary compensation performance can be apportioned as desired among the lamp control unit 132, the optical filter 113, and the component 120' of the image processor 120 (as described above in relation to the filter and the component 120' for the third embodiment).

Any necessary compensation of the brightness distribution must also be performed by the optical filter 113 and/or the component 120' in response to the brightness control signal in the fifth embodiment.

For all described embodiments, the regulation in particular of the overall brightness as in the method according to the invention may also include the provision of a brightness reserve, i.e. a so-called headroom, as described above with reference to FIG. 2*c*.

As described above in the description of the method according to the invention with reference to FIG. 2*a*, the compensation of the brightness, i.e. the resetting and conversion of the brightness, is executed in accordance with a compensation time function.

FIGS. 5*a* to 5*e* and 6 illustrate the calculation of this filter function with reference to the example of some typical brightness distributions with a more or less ideal integrator 112*a*.

FIG. 5*a* shows schematically a brightness, in particular a brightness distribution before an arc jump, for example at the moment t-2. The distribution function indicated here is uneven in both directions (X and Y), and therefore requires at least 3 sensors. FIG. 5*a* shows an example of the possible arrangement of 4 sensor elements 140-1 to 140-4 on the edge of the reference plane 6. In contrast, FIG. 5*b* shows a brightness distribution after an arc jump, for example at moment t-1. The differences in the spherical deformation of the two curved surfaces in FIG. 5*a* and FIG. 5*b* represent the differences in the brightness distribution caused by the arc jump. In contrast, the differences in height of the two curved surfaces in FIG. 5*a* and FIG. 5*b* compared with the reference plane 6 for one equal point in each case, i.e. one equal geometric location in the reference plane 6, represent the differences in the overall brightness for this point before and after the arc jump. The reference plane 6 is at an angle to the beam path, it is represented, for example, by the plane of the display field 114.

FIG. 5*c* illustrates the special case that the brightness distribution is uneven in one direction only (here the X direction); such directions in which the brightness distribution is uneven are known in some optical systems 110. In such a case, only two sensor elements 140-1 and 140-2 are needed. FIG. 5*d* shows such a brightness distribution after an arc jump.

FIG. 5*e* shows an almost even brightness distribution over the reference plane 6 as achieved by a good integrator 112*a*. The deviations in the distribution of this from an ideal uniform distribution are so minor that a shift in the distribution—caused by arc jumping—is not seen by the viewer as a disturbance. In this case there is no need to record and evaluate the shift in brightness distribution; one sensor element 104-1 is then sufficient to measure and correct the overall brightness.

The evaluation of the detected change in brightness distribution for the purpose of calculating the compensation time function will now be described in more detail with reference to FIG. 6. In the first place, it can be seen from FIG. 6 that the sensor device 140 consists, for example, of four sensor elements 140-1 . . . 140-4 which are arranged centrally on the edges of the rectangular display field 114, represented by the reference plane 6. Alternatively, the sensor elements 140-1 . . . 140-4 of the sensor device 140 may be arranged on the corners of the display field 114. In principle, however, other sensor arrangements, for example as presented above in the description of FIGS. 5*a-d*, are also possible depending on the individual case; the corresponding calculations may easily be adapted by the expert.

The sensor elements 140-*n* measure the brightness at their respective positions at the previous moment t-2. When the brightness values thus determined are viewed as a whole, the brightness distribution over the display field 114 at moment t-2 can be estimated. The same procedure is then repeated for determining the brightness distribution at the later moment t-1. The situation—dependent on the current arc position—of the brightness distribution and its amplitude (=overall brightness) at any time can be uniquely described, for example by a vector, from the knowledge of the brightness distribution function, i.e. the mathematical relationship of the brightness distribution over the area of the display field 114 of the optical system 110. If a difference is then detected in a subsequent comparison between the brightness distribution recorded at the later moment t-1 and that recorded at the previous moment t-2, this difference is represented by a difference vector ($vector_{t-1}$–$vector_{t-2}$), which, for example, as shown in FIG. 6, represents a shift of the brightness maximum at moment t-1 compared with moment t-2. The length of the vertical component of this difference vector is then a measure for the change in the overall brightness of the light incident on the display field 114. From this vector a prototype function is calculated which mathematically describes the change in the brightness distribution over the entire display field 114. The inverse function of this prototype function is the said compensation time function which, as described above, defines the necessary compensation of the brightness of the light incident on the picture screen device 118 over time.

For resetting the brightness at moment t0, as described above with reference to FIG. 2*a–d*, the compensation time function—as illustrated in FIG. 2*c*) ii)—represents precisely the difference between the two brightnesses measured at the later moment t-1 and the previous moment t-2. From the moment t0, this compensation time function is then increasingly damped during the predefined time interval T until at moment t0+T it has finally faded to zero. At the moment t0+T, compensation is no longer needed for the brightness, because then the brightness as originally caused by the arc jumping is now set, i.e. on the picture screen device 118.

In general, the more sensor elements are used, the more precisely the amount of deviation of brightness distribution from a uniform distribution can be measured in the other areas. But the more precisely also can a time change or shift of the brightness distribution between the later moment t-1 and the previous moment t-2 be recorded, and the more precisely too can the compensation time function be calculated, which then in turn enables a more precise compensation of the change in brightness.

In the fourth embodiment, in which a brightness according to FIG. 5*e* is assumed, one sensor element is sufficient for recording the overall brightness, as explained above in the description for FIG. 5*e*. There is then no need for the calculation described above with reference to FIG. 6 for the brightness distribution and changes to it with the help of the prototype function and the compensation time function.

Altogether, the combination according to the invention of compensation of the brightness distribution with compensation of the overall brightness, as described above in several embodiments, achieves a stable operating state with a subjectively constant brightness for the viewer of the image projected on the picture screen device 118. As a result of this double regulation of brightness distribution and overall brightness, an arc jump that has actually occurred remains unnoticed by the viewer; in particular, he will advantageously notice no jolt in the projected image in spite of the arc jump that has occurred.

What is claimed is:

1. An image projector (100) with:

an optical system (110), comprising a High-Intensity-Discharge HID lamp (112), in particular an Ultra High Pressure UHP lamp, and arranged after this a display field (114) and a lens unit (116) for projecting an image prepared on the display field (114) through the lens unit (116) onto a picture screen device (118);

a lamp driver (131) for providing a supply voltage to the HID lamp; and an image processor (120) for providing the image for the display field (114); characterized by a sensor device (140) for detecting the brightness, in particular the brightness distribution and/or the overall brightness, of the light incident on the display field (114) at various times;

a comparator device (150) for comparing the brightness of the light detected by the sensor device (140) at a previous moment t-2 and a moment t-1, which is later in time than moment t-2, and for generating a brightness control signal which represents a change in brightness caused by an arc jump that occurred in the HID lamp (112) between the moments t-2 and t-1; and a control device (113, 120', 132) for compensating the detected change in brightness in response to the brightness control signal by resetting the brightness of the light incident on the picture screen device (118) at a moment t0 later than t-1, in particular to the brightness detected at the previous moment t-2, and by subsequent conversion of the reset brightness during a predetermined time interval T to the brightness detected at the later moment t-1, the resetting of the brightness occurring so soon after the arc jump, and the conversion of the brightness during the time interval T occurring so slowly that the changes in the brightness of the light incident on the picture screen device (118) caused by the arc jump, the reset, and the conversion are not perceptible to the human eye.

2. An image projector (100) as claimed in claim 1, characterized in that the optical system (110) comprises an optical integrator (112*a*) connected downstream of the HID lamp (112) for an at least partial compensation of the brightness distribution of the light incident on the display field (114) so as to achieve a uniform distribution.

3. An image projector (100) as claimed in claim 1, characterized in that the control device is designed as an electrically controllable optical filter (113) and is arranged in the beam path of the optical system (110) in front of or behind the display field (114).

4. An image projector (100) as claimed in claim 3, characterized in that the optical filter (113) is designed as an adjustable gray tone mask.

5. An image projector (100) as claimed in claim 1, characterized in that the control device—if applicable, in addition to the optical filter (113)—comprises a component (120') of the image processor (120) for resetting and converting the brightness of the image provided by the image processor (120) for the display field (114) in response to the brightness control signal.

6. An image projector (100) as claimed in claim 5, characterized in that the image processor (120) is designed to output the image—so long as no arc jumping occurs—to the display field (114) with an overall brightness preferably reduced by a few percentage points compared with a nominal overall brightness of 100%; in order that, when a reduced overall brightness of the light compared with the moment t-2 has been detected in the comparison with moment t-1 because of arc jumping that took place in the meantime, it can raise the overall brightness of the image generated by the image processor (120) for the display field (114) to a maximum of at most 100% of the overall brightness in response to a part of the brightness control signal relating to the overall brightness so fast that this change in the overall brightness is not perceptible to the human eye.

7. An image projector (100) as claimed in claim 5, characterized in that the image processor (120) is designed—if no further arc jumping has occurred for at least a predetermined time interval Δt1—to increase the overall brightness of the image output to the display field (114), starting from a reduced overall brightness, to a nominal overall brightness of 100%, in order subsequently—if the arc jumping has resumed—once again to reduce the basic brightness of the image to be output to the display field (114) to a suitable overall brightness value to compensate for the change in the overall brightness caused by the arc jumping.

8. An image projector as claimed in claim 7, characterized in that both the raising of the overall brightness to 100% and also its reduction occur so slowly, preferably over a few seconds, that they are not perceptible to the human eye.

9. An image projector (100) as claimed in claim 1, characterized in that the control device, preferably in addition to the optical filter (113) and/or the component (120') of the image processor, comprises a lamp control unit (132) connected to the lamp driver (131) for controlling the light quantity emitted by the HID lamp (112) into the optical system (110) in response to a light quantity signal generated by the comparator device (150), which signal represents the overall brightness component of the brightness control signal, in so far as the overall brightness is not already being compensated by an appropriate activation of the optical filter (113) or the image processor (120).

10. An image projector (100) as claimed in claim 9, characterized in that the lamp control unit (132) is designed to implement a necessary compensation in excess of the nominal overall brightness of 100%, in compensation for the reduction in the overall brightness caused by the arc jumping.

11. An image projector (100) as claimed in claim 10, characterized in that the lamp control unit (132) is designed to activate the HID lamp (112) such that immediately after the moment to the lamp (112) additionally feeds the same light quantity (F2) into the optical system as it fed too little (F1), in relation to a nominal light quantity, into the optical system in the period between the previous arc jump and the moment t0 owing to a reduction in the brightness of the light caused by the arc jumping; or the lamp control unit (132) is designed to activate the HID lamp (112) such that immediately after the moment t0 the lamp (112) feeds the same light quantity (F2) less into the optical system as it fed too much (F1), in relation to a nominal light quantity, into the optical system in the period between the previous arc jump and the moment t0 owing to an increase in the brightness of the light caused by the arc jumping.

12. An image projector (100) as claimed in claim 1, characterized in that the sensor device (140) is designed for simultaneous detecting of the overall brightness and/or the brightness distribution of the light.

13. An image projector (100) as claimed in claim 12, characterized in that the optical system (110) comprises an optical light decoupling device, in particular a dichroic passive reflector, for decoupling a representative portion of the light incident on the display field (114); and that the sensor device (140) is arranged in a suitable position outside the beam path for detecting the decoupled part of the light.

14. An image projector (100) as claimed in claim 1, characterized in that the sensor device (140) comprises at least two sensor elements (140-1, 140-2, . . . ) arranged in different locations in the beam path of the optical system.

15. An image projector (100) as claimed in claim 14, characterized in that the sensor elements (140-1, 140-2, . . . ) are arranged in a distributed manner over the surface and/or on the edge of the display field (114).

16. An image projector (100) as claimed in claim 15, characterized in that the display field (114) is polygonal, in particular rectangular in design, and that a sensor element is arranged centrally on an edge portion and/or on the corners of the display field (114) each time.

17. A method of operating an image projector (100) with a High-Intensity-Discharge HID lamp (112), in particular an Ultra High Pressure UHP lamp, a display field (114), and a lens unit (116), comprising the step of:

projecting an image prepared on the display field (114) with the help of the HID lamp (112) through the lens unit (116) onto a picture screen device (118); characterized by:

detecting the brightness, in particular the overall brightness and/or the brightness distribution of the light incident on the display field (114) at various times;

comparing the brightness detected for the light at a previous moment t-2 and a later moment t-1, and if at the later moment t-1 a change of brightness caused by an arc jump that occurred in the HID lamp (112) was detected compared with the previous moment t-2, compensating the detected change in brightness of the light by resetting the brightness of the light incident on the picture screen device (118) in particular to the brightness recorded at the previous moment t-2, in order subsequently to convert this brightness during a predetermined time interval T to the brightness recorded at the later moment t-1, the resetting occurring so soon after the arc jumping, and the conversion of the brightness during the time interval T occurring so slowly, that the respective related changes in the brightness of the light incident on the picture screen device (118) are not perceptible to the human eye.

18. A method as claimed in claim 17, characterized in that it is established in the comparison of the brightnesses whether a geometric shift in the location of the maximum for the brightness distribution and/or a change in the overall brightness of the light detected by the sensor device (140) has occurred between the previous moment t-2 and the later moment t-1.

19. A method as claimed in claim 18, characterized in that the step for resetting the brightness comprises the following sub-steps:

calculation of a mathematical compensation time function which represents the detected change in the brightness; and modification of the current brightness of the light incident on the picture screen device (118) in accordance with the compensation time function such that the brightness of the light is once again set to that at the previous moment t-2.

20. A method as claimed in claim 17, characterized in that the step of converting the brightness of the previous moment t-2 to that of the later moment t-1 occurs in accordance with an increasing damping of the compensation time function over the time interval T in a predetermined way.

21. A method as claimed in claim 17, characterized in that the scale of the time interval T is in the range of a few seconds.

* * * * *